Patented Oct. 1, 1929

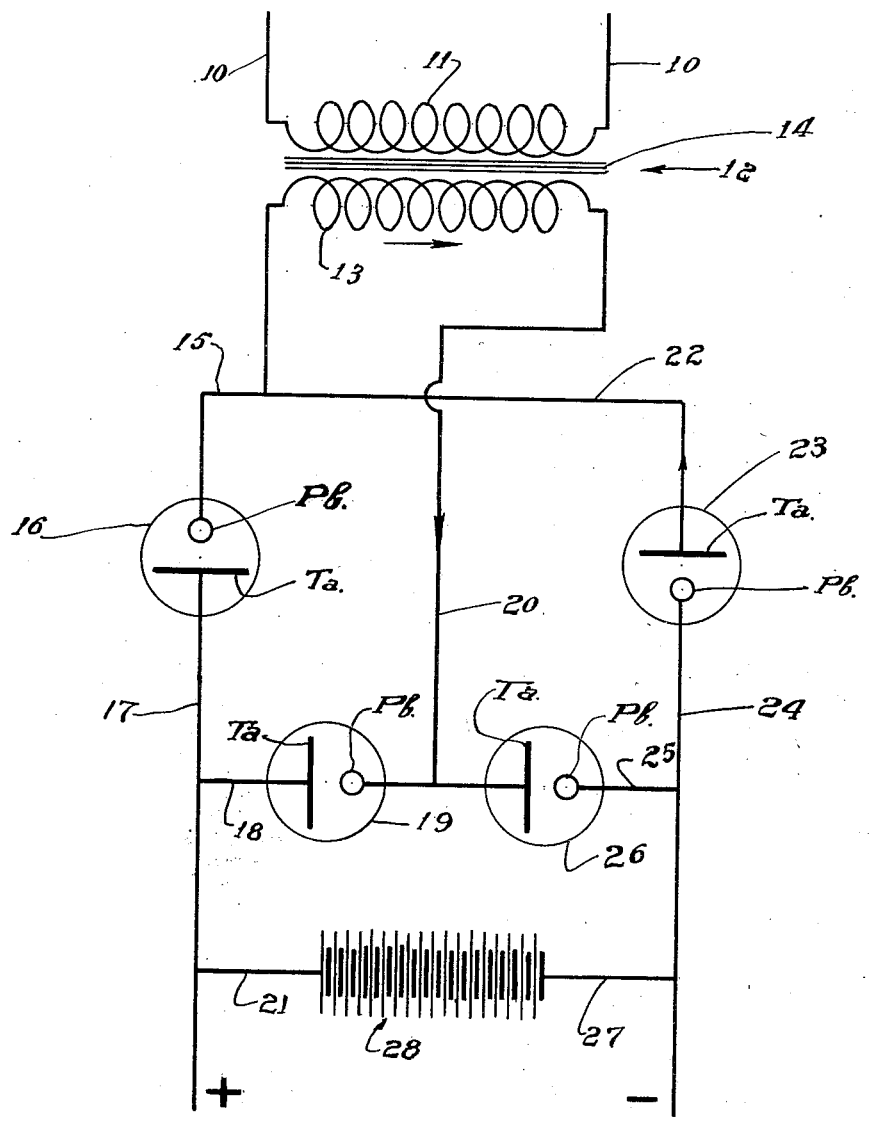

1,729,753

UNITED STATES PATENT OFFICE

CLINTON E. STRYKER, OF HIGHLAND PARK, AND ELMER W. LINCOLN, OF CHICAGO, ILLINOIS, ASSIGNORS TO FANSTEEL PRODUCTS COMPANY, INC., OF NORTH CHICAGO, ILLINOIS, A CORPORATION OF NEW YORK

RECTIFIER CIRCUITS

Application filed July 21, 1927. Serial No. 207,336.

This invention relates to rectifier circuits in which a undirectional condenser is used in conjunction with an electrolytic rectifier to improve the charging rate and to eliminate the pulsations whereby an improved source of direct current is provided for charging batteries on a switchboard or supplying power to radio receiving sets.

The object of this invention is to provide a means for increasing the charging rate and decreasing the hum in such circuits.

Other objects will be apparent from the detailed description which follows.

The drawing shows a wiring diagram illustrating our preferred embodiment.

It is well known that the size of the filmed electrode is important in electrolytic rectifiers, that a small area gives practically complete rectification and practically no capacity effect. It is also well known that in an electrolytic condenser the capacity of the cell increases with the area of the filmed electrode. In a undirectional electrolytic condenser a large filmed area also provides smaller internal resistance for the current flowing through the cell.

We have utilized these properties of rectifiers and condensers and have developed a rectifier circuit which gives a maximum charging rate and, at the same time, provides a smooth current.

An alternating current source 10, such as the ordinary electric lighting circuit, is connected by suitable means to the primary coil 11 of a transformer 12 whose secondary winding 13 is wound on the same core 14 with said primary winding. One end of the secondary coil is connected by conductor 15 to the lead terminal of a tantalum-lead-sulphuric acid rectifier 16 of the type disclosed in E. W. Engle Patent No. 1,495,582, dated May 27, 1924, Reissued October 12, 1926, as No. 16,438.

The tantalum terminal of this rectifier is connected by a conductor 17 to the direct current load. A conductor 18 connects conductor 17 with the tantalum plate of a unidirectional electrolytic condenser 19. This condenser is preferably composed of a tantalum plate having about 66 square inches of metal exposed on both sides. This plate is immersed in a sulphuric acid electrolyte (specific gravity 1.200) to which has been added a small amount of a salt of a metal of the iron group.

The other electrode of this condenser is preferably lead, although carbon, tungsten, molybdenum or other non-filming acid-proof conductor may be used.

The lead electrode in condenser 19 is connected by a conductor 20 to the other side of secondary winding 13. The end of the secondary winding, which is connected to the lead terminal of rectifier 16, is also connected by conductor 22 to the tantalum electrode of rectifier 23, the lead electrode of which is connected to the negative side of the load by conductor 24. Conductor 25 connects conductor 24 with the lead terminal of a unidirectional condenser 26 which is constructed as above specified.

The tantalum plate of this condenser is connected by conductor 20 to the end of secondary 13, as above stated. Conductor 17 is also connected by a conductor 21 to the positive terminal of a storage battery 28, the negative terminal of which is connected by conductor 27 to conductor 24.

The operation of our invention is believed to be as follows:

When the current is flowing in the direction shown by the arrows, the tantalum electrode in cell 16 acts as a closed valve and the current flows through 20, 19, 18, 17, 21, 28, 27, 24, 23 and 22, as shown. During this half wave the voltage drop across cell 19 will be very small and the voltage drop across the condenser 26 will be relatively large, which will cause a charge to be built up on the tantalum plate of condenser 26. This charge is given up as soon as the voltage begins to decrease which tends to stabilize the current in this part of the cycle.

When the current flows in the opposite direction and the tantalum electrode in cell 23 acts as a closed valve, the voltage across condenser 26 will be very low and the voltage across condenser 19 will be relatively high, whereby a charge is built up on its tantalum plate which is discharged as the voltage begins to fall in this half wave of the cycle.

We do not limit ourselves to any theory of operation and the above is merely given in an effort to explain the new and unexpected results obtained by this wiring system. If ordinary rectifiers are used in place of condensers 19 and 26, the charging rate across the twelve-cell battery is very low. By the use of unidirectional condensers 19 and 26, this charging rate is increased to about .5 amperes.

Heretofore it has been necessary to charge twelve-cell storage batteries in sections, the conductor 20 being attached to a middle point of the storage battery. This was objectionable in that the two parts of the battery were not always charged to the same extent. By our improved circuit we can dispense with the use of a central tap and can charge the whole battery as a unit.

Also, the unidirectional condensers substantially reduce the hum or noise which would occur in a telephone circuit connected to the battery while it is being charged.

While we have disclosed in detail a preferred embodiment of our invention, it is understood that we are not limited to the specific details shown except as defined by the following claim.

We claim:

In a rectifier system of the type wherein four unidirectional electrolytic cells are connected in a bridge circuit, means for increasing the rectified current comprising small-filmed-electrode cells connected to one side of the alternating current source and large-filmed-electrode cells connected to the other side of said source whereby the large filmed electrodes act as condensers to increase the charging rate and also act as rectifiers to form an integral part of the bridge circuit.

In witness whereof, we hereunto subscribe our names this 27 day of June, 1927.

CLINTON E. STRYKER.
ELMER W. LINCOLN.